United States Patent [19]

Ueno et al.

[11] Patent Number: 5,098,968

[45] Date of Patent: * Mar. 24, 1992

[54] METHOD OF PREVENTING POLYMER SCALE DEPOSITION

[75] Inventors: Susumu Ueno; Ichiro Kaneko; Mikio Watanabe, all of Ibaraki, Japan

[73] Assignee: Shin-Etsu Chemical Co., Ltd., Tokyo, Japan

[*] Notice: The portion of the term of this patent subsequent to Aug. 6, 2008 has been disclaimed.

[21] Appl. No.: 517,174

[22] Filed: May 1, 1990

[30] Foreign Application Priority Data

May 2, 1989 [JP] Japan .................................. 1-113052

[51] Int. Cl.$^5$ .............................................. C08F 2/04
[52] U.S. Cl. ..................................... 526/62; 526/206; 526/210; 422/131
[58] Field of Search ..................... 526/62, 206, 210; 422/131

[56] References Cited

U.S. PATENT DOCUMENTS

| | | |
|---|---|---|
| 4,105,840 | 8/1978 | Cohen . |
| 4,255,470 | 3/1981 | Cohen et al. ......................... 526/62 |
| 4,267,291 | 5/1981 | Jones et al. ......................... 526/62 |
| 4,555,555 | 11/1985 | Toyooka et al. . |

FOREIGN PATENT DOCUMENTS

| | | |
|---|---|---|
| 492815 | 10/1976 | Australia . |
| 151790 | 8/1985 | European Pat. Off. . |

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A method of preventing polymer scale deposition in a polymerization vessel during polymerization of a monomer having an ethylenically double bond, wherein said polymerization is carried out in a polymerization vessel of which the inner wall has a coating comprising a reaction product of a tannin and an acid halide. Polymer scale deposition on the inner wall, etc. of the polymerization vessel can be effectively prevented. The preventive agent used has neither risk of produced polymer being colored nor toxicity.

18 Claims, No Drawings

METHOD OF PREVENTING POLYMER SCALE DEPOSITION

BACKGROUND OF THE INVENTION

1. Field of the Invention

The present invention relates to a method of preventing polymer scale deposition on the inner wall and so forth of a polymerization vessel during polymerization of a monomer having an ethylenically double bond.

2. Description of Prior Art

In processes of preparing polymers by polymerizing a monomer in a polymerization vessel, the problem that polymers deposit on the inner wall and other parts which come into contact with the monomer such as stirring blades of the polymerization vessel in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer, there is a danger that the workers may be exposed to the unreacted monomer, which may give them some physical disorders.

Heretofore, there are known methods for preventing polymer scale deposition in which the inner wall and so forth are coated with various materials that act as polymer scale preventive agents, for example, particular polar compounds (Japanese Patent Publication (KOKOKU) No. 30343/1970); dyes or pigments (Japanese Patent Publication (KOKOKU) Nos. 30343/1970 and 30835/1970); an aromatic amine compound (Japanese Pre-examination Patent Publication (KOKAI) No. 50887/1976); a reaction product of a phenolic compound with an aromatic aldehyde (Japanese Pre-examination Patent Publication (KOKAI) No. 54317/1980).

These methods are effective in preventing polymer scale deposition, in the case where the monomer to be polymerized is vinyl halide such as vinyl chloride or a monomer mixture containing a large amount of vinyl halide and a small amount of other monomers copolymerizable therewith. However, the scale-preventing effect achieved varies depending on polymerization conditions such as the kind of monomers, the kind of a polymerization catalyst, form of polymerization system and the material of the inner wall of a polymerization vessel; it is difficult to prevent the scale deposition effectively and certainly. Specifically, when a polymerization catalyst with a strong oxidative effect such as potassium persulfate, acetylcyclohexylsulfonyl peroxide and di-2-ethoxyethyl peroxydicarbonate is used, the scale preventive agent forming the coating may be oxidized, so that the scale preventing effect is impaired. In the case of polymerization vessels with inner wall made of stainless steel or other steels, polymer scale deposition is liable to occur as compared with vessels lined with glass. Emulsion polymerization is liable to form polymer scale deposition as compared with suspension polymerization.

Of the scale preventive agents used in the above methods, the dyes and pigments described in Japanese Patent Publication (KOKOKU) No. 30835/1970 and 24953/1977, the aromatic amine compounds described in Japanese Pre-examination Patent Publication (KOKAI) No. 50887/1976, the reaction products of a phenolic compound with an aromatic aldehyde described in Japanese Pre-examination Patent Publication (KOKAI) No. 54317/1980 are colored and therefore possibly have a disadvantage of putting a color to product polymers.

Aniline, nitrobenzene, formaldehyde, etc. of the polar organic compounds described in Japanese Patent Publication (KOKOKU) No. 30343/1970, and the pigments containing a heavy metal such as chromium and lead described in Japanese Patent Publication (KOKOKU) No. 30835/1970 are poisonous. The dyes described in Japanese Patent Publication (KOKOKU) Nos. 30835/1970 and 24953/1977 include dyes that involve some concern about carcinogenesis. These substances may cause serious problems from viewpoint of safety in work operations.

SUMMARY OF THE INVENTION

Accordingly, it is an object of the present invention to provide a method of preventing polymer scale deposition effectively and certainly under any conditions as to the kind of monomer, etc., with no concern about coloration of manufactured polymers or safety in work operations.

The present inventors have discovered that the above object can be achieved by forming a coating comprising a particular compound on the inner wall of a polymerization vessel.

Thus, the present invention provides, as a means of solving the prior art problems, a method of preventing polymer scale deposition in a polymerization vessel during polymerization of a monomer having an ethylenically double bond, wherein said polymerization is carried out in a polymerization vessel of which the inner wall has a coating comprising a reaction product of a tannin and an acid halide.

The present invention also provides the polymerization vessel of which the inner wall has a coating comprising said reaction product of a tannin and an acid halide.

Further, the present invention provides a polymer scale preventive agent comprising said reaction product of a tannin and an acid halide.

According to the present invention, polymer scale deposition can be effectively and certainly prevented in the polymerization of monomers having an ethylenically double bond, irrespectively of the polymerization conditions such as the kind of monomers, the material of the inner wall of polymerization vessels, etc. For example, even in the case of polymerizing monomers by suspension polymerization, emulsion polymerization, bulk polymerization, solution polymerization or gas phase polymerization, or in the case of polymerizing in a stainless steel or glass-lined polymerization vessel, or in the case of using a polymerization catalyst having a strong oxidative effect, polymer scale deposition can be effectively and certainly prevented. Therefore, the operation of removing polymer scale is not required to be conducted every polymerization run; hence productivity is markedly improved. The reaction product of a tannin and an acid halide in general has no color; therefore there is no risk of manufactured polymers being colored. Accordingly, polymers of high quality can be produced stably. In addition, the scale-preventive agent used has no toxicity and therefore is safe in work operations.

DETAILED DESCRIPTION OF PREFERRED EMBODIMENTS

Reaction product of a tannin and an acid halide

The reaction product of a tannin and an acid halide used as the essential component of the scale preventive agent in the present invention is a reaction product obtained by reacting a tannin with an acid halide in an aqueous alkaline solution under heating.

The tannin used includes, for example, hydrolyzable tannins such as tannic acid, Chinese gallotannin, nutgalls tannin, sumac tannin, tara tannin, valonia tannin, chestnut tannin, myrobalan tannin, oak tannin, divi-divi tannin, algarobillatannin and the like, and condensed tannins such as gambier tannin, quebrachotannin, mimosa tannin, mangrove tannin, hemlock tannin, spruce tannin, Burma cutch tannin, oak bark tannin, tannin of persimmon and the like. These can be used singly or in combination of two or more. Among the tannins, preferred are tannic acid, Chinese gallotannin, nutgalls tannin, quebracho-tannin, mimosa tannin, oak bark tannin and tannin of persimmon.

The acid halide used in preparation of said reaction product includes, for example, the compounds represented by the formula:

RCOX wherein R represents a hydrogen atom, an alkyl group having 1 to 12 carbon atoms, an alkenyl group having 1–10 carbon atoms, and the phenyl group; and X represents a halogen atom such as fluorine, chlorine, bromine, and iodine. Such acid halides include, for example, formyl fluoride, formyl chloride, formyl bromide, formyl iodide, acetyl fluoride, acetyl chloride, propionyl chloride, n-butyryl chloride isbutyryl chloride, acryloyl chloride, crotonoyl chloride, methacryloyl chloride and benzoyl chloride. Among these, preferred are formyl chloride, acetyl chloride, isobutyl chloride, benzoyl chloride, and the like. These can be used singly or in combination of two or more.

In the above reaction for preparation of the reaction product of a tannin and an acid halide, the tannin and the acid halide are normally used in a weight ratio of preferably from 95/5 to 10/90, more preferably from 90/10 to 30/70. If the amount of the tannin is too large or too small, the reaction product may be obtained in a poor yield.

As the aqueous alkaline solution, for example, aqueous solutions of an alkaline substance such as sodium hydroxide, potassium hydroxide and ammonia can be used. The aqueous alkaline solution normally contains the alkaline substance in a concentration of, preferably, from 1 to 50% by weight, more preferably from 5 to 30% by weight.

The reaction is normally carried out at a temperature of from 10° C. to 200° C., preferably from 20° C. to 100° C., normally for 0.1 to 24 hours, preferably from about 0.5 to 10 hours, preferably under stirring.

Formation of the coating

The coating comprising said reaction product can be formed, for example, by applying a coating solution comprising said reaction product on the inner wall of a polymerization vessel, followed by drying.

The coating solution can be prepared by dissolving or dispersing the reaction product in a suitable solvent. The concentration of the reaction product may be normally from about 0.005% by weight to about 5% by weight, preferably from 0.05 to 2% by weight. However, the concentration is not particularly limited, as long as the desired coating weight is obtained.

The solvent used for preparation of the coating solution includes, for example, water; alcohols such as methanol, ethanol, propanol, 1-butanol, 2-butanol, 2-methyl-1-propanol, 2-methyl-2-propanol, 3-methyl butanol, 2-methyl-2-butanol, and 2-pentanol; ketones such as acetone, methyl ethyl ketone, and methyl isobutyl ketone; esters such as methyl formate, ethyl formate, methyl acetate, and methyl acetoacetate; ethers such as 4-methyl dioxolan, ethylene glycol diethyl ether and 1,4-dioxane; furans such as tetrahydrofuran; aprotic solvents such as dimethylformamide, dimethyl sulfoxide, and acetonitrile; aliphatic hydrocarbon solvents such as n-hexane and n-pentane; aromatic hydrocarbon solvents such as toluene and xylene; and halogenated hydrocarbon solvents such as 1,1,1-trichloroethylene and 1,1,1,2-tetrachloroethylene. These solvents are appropriately used singly or as a mixed solvent of two or more.

The coating solution is applied to the inner wall surface of the polymerization vessel, thoroughly dried, and optionally washed with water as required, to form the coating having scale preventing effect. The drying of the solution applied on the inner wall may be conducted, for example, at a temperature of from room temperature to 100° C.

Preferably, the coating comprising said reaction product is also previously formed on other parts of the polymerization vessel with which the monomer comes into contact during polymerization, in addition to the inner wall. Such parts include, for example, stirring blades, a stirring shaft, a condenser, a header, baffles, search coils, bolts, nuts, etc. The coating on these parts can be formed in the same manner as described above. Particularly, stirring blades, stirring shaft, and baffles should be coated.

Moreover, preferably, the coating solution is also applied to parts of recovery system for an unreacted monomer with which the unreacted monomer may come into contact, for example, the inner surfaces of monomer distillation columns, condensers, monomer stock tanks and valves. Scale formation can be thereby prevented at these parts due to a coating thus formed.

The method of applying the coating solution is not particularly limited, and includes typically the brush coating, spray coating, the method of filing the polymerization vessel with the coating solution followed by withdrawal thereof, and automatic coating methods as disclosed in Japanese Pre-examination Patent Publication (KOKAI) Nos. 61001/1982, 36288/1980 and 11303/1984, Japanese Pre-examination Publication (KOHYO) Nos. 501116/1981 and 501117/1981. The method of drying wet coated surfaces is not limited, either. Following methods can be used. For example, a method in which, after the solution is applied, hot air with an suitable elevated temperature is blown to the coated surface, and a method in which the inner wall surface of a polymerization vessel and other parts to be coated are previously heated, and the coating solution is directly applied on the heated inner wall surface, etc. After dried, the coated surfaces are washed with water if necessary.

The coating thus formed has normally a coating weight of 0.005 g/m$^2$ or more, preferably from 0.005 to 5 g/m², more preferably from 0.05 to 2 g/m² in the dried state.

The coating operation may be conducted every 1 to ten-odd polymerization runs. The formed coating has considerably good durability and retains the scale-preventing effect; therefore the coating operation is not necessarily performed every polymerization run.

Polymerization

After the formation of the coating on the inner wall surface of a polymerization vessel, etc., polymerization is carried out in accordance with conventional procedures. That is, a monomer having an ethylenically double bond, a polymerization initiator, and other necessary additives such as a dispersing agent for the monomer, and optionally a polymerization medium are charged into the polymerization vessel, followed by carrying out polymerization.

The monomer having an ethylenically double bond to which the method of this invention can be applied may include, for example, vinyl halides such as vinyl chloride; vinyl esters such as vinyl acetate and vinyl propionate; acrylic acid and methacrylic acid, or esters or salts of these; maleic acid or fumaric acid, and esters or anhydrides thereof; and diene monomers such as butadiene, chloroprene and isoprene; as well as styrene, α-methylstyrene, acrylates, acrylonitrile, halogenated vinylidenes, and vinyl ethers.

There are no particular limitations on the form of polymerization to which the method of this invention can be applied. The present invention is effective in any forms of polymerization such as suspension polymerization, emulsion polymerization, solution polymerization, bulk polymerization, and gas phase polymerization.

More specifically, in the case of suspension or emulsion polymerization, polymerization is generally carried out by a process comprising the steps of charging water and a dispersing agent into a polymerization vessel, charging a polymerization initiator, evacuating the inside of the polymerization vessel to a pressure of from about 0.1 mmHg to about 760 mmHg, charging a monomer (whereupon the pressure inside the polymerization vessel usually becomes from 0.5 to 30 kg.cm$^{-2}$), polymerizing the monomer at a temperature of from about $-10°$ C. to 150° C., and optionally adding at least one of water, a dispersing agent and polymerization initiator during polymerization. The polymerization may be judged to be completed when the pressure inside the vessel falls to from about 0 to about 7 kg.cm$^{-2}$G The water, dispersing agent and polymerization initiator are used in amounts of about 20 to about 300 parts by weight, about 0.01 to about 30 parts by weight, and about 0.01 to about 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those as described for suspension or emulsion polymerization.

In the case of bulk polymerization, the process typically comprises the steps of evacuating the inside of a polymerization vessel to a pressure of from about 0.01 mmHg to about 760 mmHg, charging a monomer, and then charging a polymerization initiator, and then carrying out polymerization at $-10°$ C. to 250° C.

The method of this invention is effective regardless of the materials constituting the inner wall, etc. of a polymerization vessel. That is, this method is effective for any type of polymerization vessels having inner wall made of stainless steel or lined with glass.

Accordingly, any additive materials that are conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, di-2-ethylhexyl peroxydicarbonate, 3,5,5-trimethylhexanoyl peroxide, α-cumyl peroxyneodecanoate, cumene hydroperoxide, cyclohexanone peroxide, t-butyl peroxypivalate, di-2-ethoxyethyl peroxydicarbonate, benzoyl peroxide, lauroyl peroxide, 2,4-dichlorobenzoyl peroxide, diisopropyl peroxydicarbonate, acetylcyclohexylsulfonyl peroxide, α,α'-azobisisobutyronitrile, α,α'-azobis-2,4-dimethylvaleronitrile, potassium persulfate, ammonium persulfate, p-menthane hydroperoxide; suspension agents comprised of natural or synthetic polymers such as partially oxidized polyvinyl acetates, polyacrylic acids, vinyl acetate/maleic anhydride copolymer, cellulose derivatives such as hydroxypropyl cellulose, and gelatin; solid dispersants such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dibutyltin mercaptide; lubricants such as rice wax and stearic acid; plasticizers such as DOP and DBP; chain transfer agents such as trichloroethylene and mercaptans; pH adjusters.

EXAMPLES

The method of the present invention is now described by way of working examples and comparative examples. In each of the tables below, Experiment Nos. marked with * indicate comparative examples, and the other Experiment Nos., working examples of the present invention.

Production of reaction products (1) Production of Reaction Product No. 1

In 300 g of water was dissolved 30 g of tannic acid, and 30 g of benzoyl chloride was then added. After 25 g of a 20% aqueous sodium hydroxide solution was added thereto, the mixture was allowed to react at 30° C. for 1 hour under stirring.

The resulting reaction mixture was filtered, and the residue obtained was washed with water 5 to 6 times, followed by drying to give 45 g of a desired compound (hereinafter called Reaction Product No.1).

(2) Production of Reaction Product No. 2

In 300 g of water was dissolved 40 g of tannin of persimmon, and 10 g of acetyl chloride was then added. After 20 g of a 20% aqueous potassium hydroxide solution was added thereto, the mixture was allowed to react at 30° C. for 1 hour under stirring.

The resulting reaction mixture was filtered, and the residue obtained was washed with water 5 to 6 times, followed by drying to give 47 g of a desired compound (hereinafter called Reaction Product No.2).

(3) Production of Reaction Product No. 3

In 300 g of water was dissolved 30 g of nutgalls tannin, and 20 g of benzoyl chloride was then added. After 20 g of a 20% aqueous sodium hydroxide solution was added thereto, the mixture was allowed to react at 50° C. for 0.5 hour under stirring.

The resulting reaction mixture was filtered, and the residue obtained was washed with water 5 to 6 times, followed by drying to give 40 g of a desired compound (hereinafter called Reaction Product No.3).

EXAMPLE 1

Polymerization was carried out in the following manner using a polymerization vessel with an inner capacity of 1,000 liters and having a stirrer.

In each experiment, first, a reaction product as prepared above was dissolved in a solvent as shown in Table 1 to prepare a coating solution. The coating solution was applied to the inner wall and other parts with which monomers come into contact during polymerization, such as the stirring shaft, stirring blades and baffles. Then, the wet coated surfaces were dried by heating at 50° C. for 15 min., followed by washing with water. However, Experiment Nos. 101 to 103 are comparative examples in which no coating solution was applied, or a coating solution containing a tannin was applied. The reaction product of a tannin and an acid halide used, its concentration; and the solvent used in each experiment are given in Table 1.

Subsequently, in the polymerization vessel thus coated, were charged 400 kg of water, 200 kg of vinyl chloride, 250 g of partially saponified polyvinyl alcohol, 25 g of hydroxypropylmethyl cellulose and 75 g of diisopropyl peroxydicarbonate. Then, polymerization was carried out at 75° C. with stirring for 6 hours. After the completion of the polymerization, the amount of polymer scale depositing on the inner wall of the polymerization vessel was measured. The results are given in Table 1.

TABLE 1

| Experiment No. | Coating solution | | | Amount of scale, g/m² |
|---|---|---|---|---|
| | Compound dissolved | Solvent (wt. ratio) | Concentration wt. % | |
| 101* | — | — | — | 1,300 |
| 102* | Tannic acid | Water/methanol (50/50) | 0.5 | 1,200 |
| 103* | Tannin of persimmon | Water/methanol (50/50) | 0.5 | 1,200 |
| 104 | R.Product No.1 | Water/methanol (50/50) | 0.5 | 10 |
| 105 | R.Product No.2 | Water/methanol (50/50) | 0.5 | 16 |
| 106 | R.Product No.3 | Water/methanol (50/50) | 0.5 | 12 |
| 107 | R.Product No.1 | Water/methanol (50/50) | 1.0 | 7 |
| 108 | R.Product No.2 | Water/methanol (70/30) | 1.0 | 11 |
| 109 | R.Product No.3 | Water/methanol (50/50) | 1.0 | 8 |
| 110 | R.Product No.1 | Methanol | 0.5 | 7 |
| 111 | R.Product No.2 | Methanol | 0.5 | 14 |
| 112 | R.Product No.3 | Methanol | 0.5 | 10 |

EXAMPLE 2

In each experiment, a polymerization vessel with an inner capacity of 20 liters and having a stirrer was coated with the coating solution of Experiment No. in Example 1 as shown in Table 2, followed by drying in the same manner as in Example 1. However, Experiment No. 201 is a comparative example in which no coating solution was coated.

Subsequently, in the polymerization vessel thus coated, were charged 9 kg of water, 225 g of sodium dodecylbenzenesulfonate, 12 g of t-dodecyl mercaptan, and 13 g of potassium persulfate. After the inner atmosphere was replaced with a nitrogen gas, 1.3 kg of styrene and 3.8 kg of butadiene were charged, followed by polymerization at 50° C. for 20 hours.

After completion of the polymerization, the amount of polymer scale deposition on the inner wall of the polymerization vessel was measured. The results are given in Table 2.

TABLE 2

| Experiment No. | Coating solution | Amount of scale g/m² |
|---|---|---|
| 201* | — | 400 |
| 202* | Experiment No. 102 | 390 |
| 203* | Experiment No. 103 | 390 |
| 204 | Experiment No. 104 | 7 |
| 205 | Experiment No. 106 | 10 |
| 206 | Experiment No. 107 | 7 |
| 207 | Experiment No. 108 | 14 |
| 208 | Experiment No. 109 | 8 |
| 209 | Experiment No. 110 | 8 |
| 210 | Experiment No. 112 | 7 |

We claim:

1. A method of preventing polymer scale deposition in a polymerization vessel during polymerization of a monomer having an ethylenically unsaturated double bond, wherein said polymerization is carried out in a polymerization vessel of which the inner wall has a coating comprising a reaction product of a tannin and an acid halide.

2. The method according to claim 1, wherein said reaction product is produced by reacting a tannin with an acid halide in an aqueous alkaline solution under heating.

3. The method according to claim 1, wherein said tannin is selected from the group consisting of tannic acid, Chinese gallotannin, nutgalls tannin, quebrachotannin, mimosa tannin, oak bark tannin and tannin of persimmon.

4. The method according to claim 1, wherein said acid halide is selected from the group consisting of formyl chloride, acetyl chloride, isobutyl chloride, and benzoyl chloride.

5. The method according to claim 2, wherein said tannin and said acid halide are reacted at a tannin/acid halide ratio of from 95/5 to 10/90.

6. The method according to claim 1, wherein said coating has been formed by applying a coating solution comprising said reaction product on the inner wall of a polymerization vessel, followed by drying.

7. The method according to claim 6, wherein said coating solution contains the reaction product in a concentration of from 0.005 to 5% by weight.

8. The method according to claim 1, wherein said coating has a coating weight of at least 0.005 g/m².

9. The method according to claim 1, wherein said coating has been also previously formed on parts of the polymerization vessel with which the monomer comes into contact during polymerization other than its inner wall surface.

10. The method according to claim 9, wherein said parts with which the monomer comes into contact are selected from the group consisting of a stirring shaft, stirring blades, baffles, headers, search coils and condensers.

11. The method according to claim 1, wherein said coating has been further previously formed at parts of the recovery system of an unreacted monomer with which the monomer comes into contact during polymerization.

12. The method according to claim 1, wherein the monomer is at least one member selected from the group consisting of vinyl halides; vinyl esters; acrylic acid and methacrylic acid, or esters or salts of these; maleic acid or fumaric acid, and esters or anhydrides thereof; diene monomers; aromatic vinyl compounds; acrylates; acrylonitrile; halogenated vinylidenes; and vinyl ethers.

13. The method according to claim 1, wherein said polymerization is carried out as suspension polymerization, emulsion polymerization, solution polymerization, bulk polymerization, or gas phase polymerization.

14. A polymer scale preventive agent comprising a reaction product of a tannin and an acid halide.

15. A polymerization vessel of which the inner wall has a coating comprising a reaction product of a tannin and an acid halide.

16. The method according to claim 1, wherein said acid halide is of the formula:

RCOX wherein R is hydrogen, $C_1$-$C_{12}$ alkyl, $C_1$-$C_{10}$ alkenyl or phenyl, and X is halogen.

17. The polymer scale preventive agent according to claim 14, wherein said acid halide has the formula:

RCOX wherein R is hydrogen, $C_1$-$C_{12}$ alkyl, $C_1$-$C_{10}$ alkenyl or phenyl, and X is halogen.

18. The polymerization vessel according to claim 15, wherein said acid halide has the formula:

RCOX wherein R is hydrogen, $C_1$-$C_{12}$ alkyl, $C_1$-$C_{10}$ alkenyl or phenyl, and X is halogen.

* * * * *